(12) United States Patent
Auzerais et al.

(10) Patent No.: US 10,907,090 B2
(45) Date of Patent: Feb. 2, 2021

(54) IN SITU SOLID ORGANIC PILLAR PLACEMENT IN FRACTURE NETWORKS

(71) Applicant: SCHLUMBERGER TECHNOLOGY CORPORATION, Sugar Land, TX (US)

(72) Inventors: Francois Auzerais, Boston, MA (US); Meng Qu, Waltham, MA (US); Shitong S. Zhu, Waban, MA (US); Agathe Robisson, Cambridge, MA (US); Yucun Lou, Belmont, MA (US); Syed Afaq Ali, Sugar Land, TX (US); Bruce Alexander Mackay, Sugar Land, TX (US); Sandeep Verma, Acton, MA (US); Sharath Chandra Mahavadi, Lexington, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 14 days.

(21) Appl. No.: 15/766,473

(22) PCT Filed: Jul. 26, 2016

(86) PCT No.: PCT/US2016/043976
§ 371 (c)(1),
(2) Date: Apr. 6, 2018

(87) PCT Pub. No.: WO2017/062086
PCT Pub. Date: Apr. 13, 2017

(65) Prior Publication Data
US 2018/0298271 A1 Oct. 18, 2018

Related U.S. Application Data

(60) Provisional application No. 62/237,319, filed on Oct. 5, 2015.

(51) Int. Cl.
*C09K 8/68* (2006.01)
*E21B 43/267* (2006.01)
(Continued)

(52) U.S. Cl.
CPC .............. *C09K 8/685* (2013.01); *C09K 8/601* (2013.01); *C09K 8/62* (2013.01); *C09K 8/70* (2013.01);
(Continued)

(58) Field of Classification Search
CPC .......... C09K 8/685; C09K 8/601; C09K 8/62; C09K 8/70; C09K 8/703; C09K 8/80; C09K 8/94; E21B 43/267; E21B 43/26
See application file for complete search history.

(56) References Cited

U.S. PATENT DOCUMENTS 4,982,786 A   1/1991   Jennings, Jr.
6,228,812 B1  5/2001   Dawson et al.
(Continued)

FOREIGN PATENT DOCUMENTS

WO   2012170522 A2   12/2012
WO   2015026369 A1   2/2015

OTHER PUBLICATIONS

Aldosari, M. A. et aL., "Synthesis and Characterization of the in Situ Bulk Polymerization of PMMA Containing Graphene Sheets Using Microwave Irradiation", Molecules, 2013, 16, pp. 3152-3167.
(Continued)

*Primary Examiner* — Crystal J Miller
(74) *Attorney, Agent, or Firm* — Trevor Grove

(57) ABSTRACT

Methods include introducing a multistage treatment fluid into one or more intervals of a wellbore, wherein the treatment fluid contains one or more stages of a polymer-forming composition and one or more stages of a spacer fluid and initiating polymerization of the one or more stages
(Continued)

of polymer-forming composition. Methods may include designing a multistage treatment fluid containing one or more stages of a polymer-forming composition and one or more stages of a spacer fluid, wherein or more stages of the polymer-forming composition comprises a thermosetting polymer; and pumping the multistage treatment fluid into a wellbore, wherein the pumping rate is determined by constructing a model based upon (a) the minimum pumping rate determined from the critical reaction temperature and the downhole temperature, (b) the fracture closing time, (c) the temperature within one or more fractures, and (d) the maximum pumping rate.

17 Claims, 9 Drawing Sheets

(51) Int. Cl.
C09K 8/70 (2006.01)
C09K 8/94 (2006.01)
C09K 8/62 (2006.01)
C09K 8/60 (2006.01)
C09K 8/80 (2006.01)

(52) U.S. Cl.
CPC ............... C09K 8/703 (2013.01); C09K 8/80 (2013.01); C09K 8/94 (2013.01); E21B 43/267 (2013.01); C09K 2208/08 (2013.01); C09K 2208/10 (2013.01); C09K 2208/26 (2013.01)

(56) References Cited

U.S. PATENT DOCUMENTS

| | | |
|---|---|---|
| 6,776,235 B1 | 8/2004 | England |
| 10,100,245 B1 | 10/2018 | Bulekbay et al. |
| 2006/0048943 A1 | 3/2006 | Parker et al. |
| 2006/0048944 A1 | 3/2006 | van Batenburg et al. |
| 2008/0028994 A1 | 2/2008 | Barlet-Gouedard et al. |
| 2008/0196896 A1 | 8/2008 | Bustos et al. |
| 2011/0186293 A1 | 8/2011 | Gurmen et al. |
| 2012/0129737 A1* | 5/2012 | Lesko ............... C09K 8/665 507/211 |
| 2012/0267111 A1* | 10/2012 | Khlestkin ............ C09K 8/508 166/305.1 |
| 2013/0146292 A1* | 6/2013 | Litvinets ............. C09K 8/80 166/308.1 |
| 2014/0020893 A1 | 1/2014 | Smith et al. |
| 2014/0060831 A1* | 3/2014 | Miller ............... E21B 43/267 166/280.1 |
| 2014/0083702 A1* | 3/2014 | Godfrey ............. C09K 8/422 166/295 |
| 2014/0131041 A1* | 5/2014 | Liang ................ C09K 8/805 166/280.2 |
| 2014/0144634 A1* | 5/2014 | Nguyen ............. E21B 43/261 166/281 |
| 2014/0290943 A1 | 10/2014 | Ladva et al. |
| 2014/0374095 A1* | 12/2014 | Ladva .............. C09K 8/80 166/280.2 |
| 2015/0107835 A1 | 4/2015 | Panga et al. |
| 2015/0167443 A1* | 6/2015 | Litvinets ............. C09K 8/665 166/280.1 |
| 2016/0130499 A1* | 5/2016 | Nguyen ............. C09K 8/805 166/280.2 |
| 2016/0153274 A1 | 6/2016 | Hull et al. |
| 2017/0002623 A1 | 1/2017 | Lecerf et al. |
| 2017/0101572 A1 | 4/2017 | Qu et al. |
| 2017/0218259 A1* | 8/2017 | Fujii ............... E21B 43/267 |
| 2018/0134948 A1* | 5/2018 | Chopade ............ C09K 8/80 |
| 2019/0264095 A1 | 8/2019 | Qu et al. |

OTHER PUBLICATIONS

Aubry, J. et al., "Nanoprecipitation of Polymethylmethacrylate by Solvent Shifting: 1. Boundaries", Langmuir, 2009, 24(4), pp. 1970-1979.

Chen W. et al., "In situ synthesis of poly(methyl methacrylate)/MgAl layered double hydroxide nanocomposite with high transparency and enhanced thermal properties", Solid State Communications, 2004, 130, pp. 259-263.

Chindaprasirt, P. et al., "Workability and strength of coarse high calcium fly ash geopolymer", Cement and Concrete Composites, 2007, 29(3), pp. 224-229.

Colangelo, F. et al., "Preparation and Characterization of New Geopolymer-Epoxy Resin Hybrid Mortars", Materials, 2013, 6, pp. 2989-3006.

Cole, R. C., "Epoxy Sealant for Combating Well Corrosion", SPE 7874, SPE Oilfield and Geothermal Chemistry Symposium, Houston, Texas, U.S.A., 1979, 11 pages.

Dewprashad, B. et al., "A Method to Select Resin-Coated Proppants", SPE 26523, SPE Annual Technical Conference and Exhibition, Houston, Texas, U.S.A., 1993, pp. 177-184.

Dewprashad, B. et al., "Epoxy Resin Consolidation System Improves Worker Safety, Chemical Compatibility, and Performance", SPE 38189, SPE European Formation Damage Conference, The Hague, Netherlands, 1997, pp. 437-444.

Favier, A. et al., "Flow properties of MK-based geopolymer pastes", Soft Matter, 2014,10(8), pp. 1134-1141.

Fernandez-Jimenez, A. et al., "Alkaline activation of metakaolin-fly ash mixtures: Obtain of Zeoceramics and Zeocements", Microporous and Mesoporous Materials, 2008, 108(1-3), pp. 41-49.

Grubbs, R. H.. et al., "Living Ring-Opening Olefin Metathesis Polymerization" in Polymer Science: A Comprehensive Reference, 2012, vol. 4, pp. 21-29.

Hamerton, I. et al., "Metals and coordination compounds as modifiers for epoxy resins", Coordination Chemistry Reviews, 2002, 224, pp. 67-85.

Kamhangrittirong, P. et al., "Synthesis and Properties of High Calcium Fly Ash Based Geopolymer for Concrete Applications", 36th Conference on Our World in Concrete and Structures, Singapore, 2011, 9 pages.

Li, X. et al., "Mechanical Properties and Microstructure of Class C Fly Ash-Based Geopolymer Paste and Mortar", Materials, 2013, 6, pp. 1485-1495.

Malik, Q. M. et al., "CO2 Injection in the Weyburn Field of Canada: Optimization of Enhanced Oil Recovery and Greenhouse Gas Storage With Horizontal Wells", SPE 59327, presented at the SPE/DOE Improved Oil Recovery Symposium, Tulsa, Oklahoma, U.S.A., 2000, 16 pages.

Montes, C. et al., "Influence of Activator Solution Formulation on Fresh and Hardened Properties of Low-Calcium Fly Ash Geopolymer Concrete", Coal Combustion and Gasification Products, 2012, 4, 9 pages.

Ng, R. C. et al., "Coiled Tubing Resin Squeeze to Mitigate Water Production in Offshore Gravelpack Wells", SPE 38836, SPE Annual Technical Conference and Exhibition, San Antonio, Texas, U.S.A., pp. 869-881.

Peng, F.. et al., "Polybutadiene Grafting and Crosslinking in High-Impact Polystyrene Bulk Thermal Process", Journal of Applied Polymer Science, 1990, 40, pp. 1289-1302.

Petermann, J. C. et al., "Alkali-activated geopolymers: a literature review", Air Force Research Laboratory Materials and Manufacturing Directorate, 2010, 99 pages.

Saunders, L. W. et al., "Performance Review of Phenolic-Resin Gravel Packing", SPE 8425, Journal of Petroleum Technology, 1981, 33(2), pp. 221-228.

Singh, B. et al., "Geopolymer concrete: A review of some recent developments", Construction and Building Materials, 2015, 85, pp. 78-90.

Soriano-Corral, F. et al., "Synthesis and Characterization of High Impact Polystyrene from a Heterogeneous Styrene-Rubber-Polystyrene Solution: Influence of PS Concentration on the Phase

(56) References Cited

OTHER PUBLICATIONS

Inversion, Morphology and Impact Strength"., Macromolecular Symposia, 2013, 325-326, pp. 177-183.

Traubel, H., "Precipitation of Polymers in Water-Based Dispersions" in New Materials Permeable to Water Vapour, 1999, Springer, 14 pages.

Wheeler, R. S., "A Study of High-Quality Foamed Fracturing Fluid Properties", CSUG/SPE 137761, Canadian Unconventional Resources and International Petroleum Conference, Calgary, Alberta, Canada, 2010, pp. 18 pages.

Yew, C. H., "Mechanics of Hydraulic Fracturing", Gulf Publishing Company, 1997, Houston, Texas, USA, p. 167.

Search Report and Written Opinion of International Patent Application No. PCT/US2017/037584, dated Sep. 12, 2017, 12 pages.

* cited by examiner

IN SITU SOLID ORGANIC PILLAR PLACEMENT IN FRACTURE NETWORKS

CROSS REFERENCE TO RELATED APPLICATIONS

This application claims priority from U.S. Ser. No. 62/237,319, filed Oct. 5, 2015, entitled "In situ solid organic pillar placement in hydraulic fracture networks", the contents of which are incorporated herein by reference.

BACKGROUND

Fracturing operations conducted in a subterranean formation may enhance the production of fluids by injecting pressurized fluids into the wellbore to induce hydraulic fractures and flow channels connecting isolated reservoirs. Fracturing fluids may deliver varying chemical additives and proppant particulates into the formation during fracture extension. Following the injection of fracture fluids, proppants injected into the fractures prevent closure as the pressure decreases below the formation fracture pressure. The propped open fractures then allow fluids to flow from the formation through the proppant pack to the production wellbore.

The success of the fracturing treatment may depend on the ability of fluids to flow from the formation through the proppant pack installed after initiating the fracture. Particularly, increasing the permeability of the proppant pack relative to the formation may decrease resistance to the flow of connate fluids into the wellbore. Further, it may be desirable to minimize the damage to the surface regions of the fracture to maximize connected porosity and fluid permeability for optimal flow from the formation into the fracture.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, methods in accordance with the present disclosure may include introducing a multistage treatment fluid into one or more intervals of a wellbore, wherein the treatment fluid contains one or more stages of a polymer-forming composition and one or more stages of a spacer fluid and initiating polymerization of the one or more stages of polymer-forming composition.

In another aspect, methods may include introducing a multistage treatment fluid into one or more intervals of a wellbore, wherein the treatment fluid contains one or more stages of a polymer-forming composition and one or more stages of a spacer fluid, wherein the one or more stages of the polymer-forming composition contain a polymer dissolved in a solvent and precipitating the polymer from the solvent and forming a polymeric pillar within a fracture in the one or more intervals of a wellbore.

In another aspect, methods may include designing a multistage treatment fluid containing one or more stages of a polymer-forming composition and one or more stages of a spacer fluid, wherein one or more stages of the polymer-forming composition comprises a thermosetting polymer and pumping the multistage treatment fluid into a wellbore, wherein the pumping rate is determined by constructing a model based upon (a) the minimum pumping rate determined from the critical reaction temperature and the downhole temperature, (b) the fracture closing time, (c) the temperature within one or more fractures within the wellbore, and (d) the maximum pumping rate.

Other aspects and advantages of the subject disclosure will be apparent from the following description and the appended claims.

DETAILED DESCRIPTION

Figure 1:
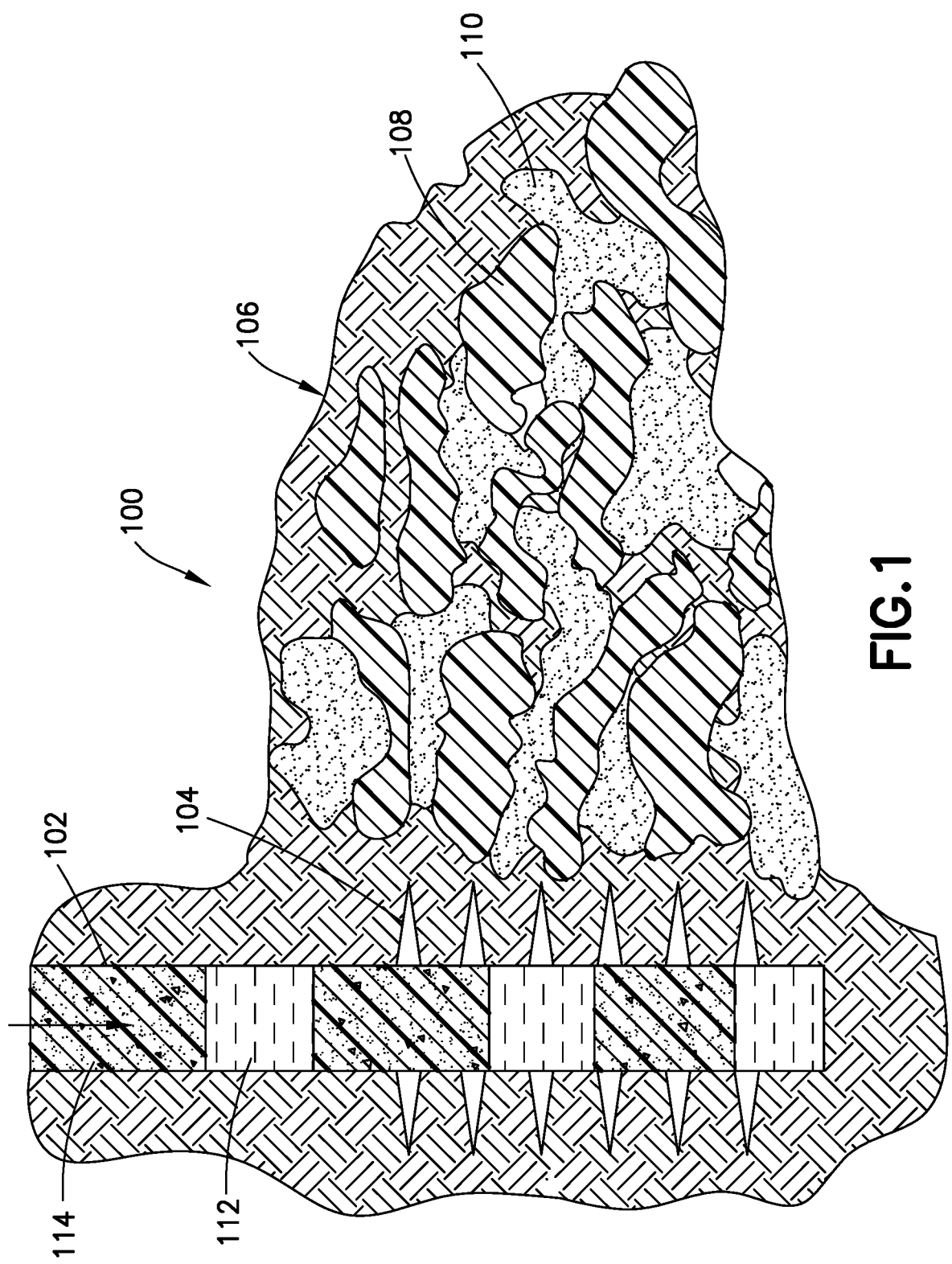
FIG. 1 is an illustration of a treatment fluid being injected into a wellbore interval in accordance with embodiments of the present disclosure.

The particulars shown herein are by way of example and for purposes of illustrative discussion of the examples of the subject disclosure only and are presented in the cause of providing what is believed to be the most useful and readily understood description of the principles and conceptual aspects of the subject disclosure. In this regard, no attempt is made to show structural details in more detail than is necessary, the description taken with the drawings making apparent to those skilled in the art how the several forms of the subject disclosure may be embodied in practice. Furthermore, like reference numbers and designations in the various drawings indicate like elements.

Embodiments in accordance with the present disclosure relate to fracture stimulation techniques in which a polymer-forming composition may be emplaced within one or more regions of a wellbore. Polymer-forming compositions in accordance with the present disclosure may generate polymeric "pillars" that stabilize fractures within a given formation. Pillars in accordance with the present disclosure are load-bearing solid support structures that hold fractures open to allow reservoir production from induced and natural fracture networks. In some embodiments, polymeric pillars are created from polymer-forming compositions that polymerize to form polymers or higher order polymers such as co-polymers, crosslink to form polymeric particulates, or precipitate polymer particles through changes in solubility induced by changes in pH, ionic strength, or solvent.

In one or more embodiments, methods in accordance with the present disclosure may involve creating staged fractures along a wellbore by injecting pressurized treatment fluids to initiate fractures in the formation. In some embodiments, a fracture fluid pad may be followed by injecting a multistage treatment fluid containing one or more stages of a polymer-forming composition partitioned by a spacer fluid. However, depending on the properties of the treatment fluid, the fracture fluid pad may be omitted in some embodiments and the multistage treatment fluid may be used directly to generate sufficient hydraulic fracture width and provide better fluid loss control. In one or more embodiments, multistage treatment fluids may include one or more stages containing energized fluids or foams including a gaseous component such as nitrogen, carbon dioxide, air, or a combination thereof.

Multistage treatment fluids in accordance with the present disclosure may contain a predetermined sequence of stages of fluid volumes or "pulses," including one or more stages of a polymer-forming composition that create a series of polymer pillars that function to prop open fractures and provide regions of increased permeability through the hydraulically fractured network. When employed during fracturing operations, polymer-forming composition may be emplaced within an interval of a wellbore during fracture initiation, enter into the fractures, and polymerize to generate support structures that prop open the fractures without damaging the overall fracture network. In some embodiments, polymer-forming materials may be selected such that the formation of the polymeric material occurs before the fracture closure stress seals opened fractures. Polymerized materials deposited from the polymer-forming compositions may then hold existing and newly formed fractures open, while eliminating or minimizing uncontrolled propagation of fractures from the wellbore. Moreover, during production, polymeric pillars generated may hold fractures open at discrete locations while reservoir fluids are transported through open channels and voids between the pillars.

In one or more embodiments, methods in accordance with the present disclosure may include emplacing a multistage treatment fluid containing fluid stages of polymer-forming compositions in combination with spacer fluid stages that function to separate the polymer-forming stages. In some embodiments, spacer fluid stages may also contain various additives such as degradable solids and fillers that may be removed following emplacement and curing of the polymer-containing components of the treatment fluid. For example, following the injection of a multistage treatment fluid, degradable filler materials used to partition the polymeric pillars may degrade upon exposure to formation temperatures or aqueous connate fluids or be removed by the injection of aqueous fluids, solvents or degrading agents such as an acid, base, enzyme, or oxidizer.

In some embodiments, treatment fluids in accordance with the present disclosure may modify fluid conductivity in induced fractures without the use of proppants, may be used for earlier intervention in earlier phases of fracturing operations including use as a component of an initiation pad, and may be used to treat regions of the formation where finer fractures may render proppant delivery more difficult. Methods of the present disclosure may be employed at any stage of the formation fracturing process and may be used to stabilize the entire fracture network, including natural fractures and induced hydraulic fractures including fractures started at the wellbore and new fractures initiated within a network of existing fractures. Further, treatment fluids in accordance with the present disclosure may also increase the longevity of pumps and other surface equipment, because the delivery of polymer-forming materials downhole may reduce pumping energy requirements and abrasive erosion associated with delivering solid proppants downhole.

Figure 2:
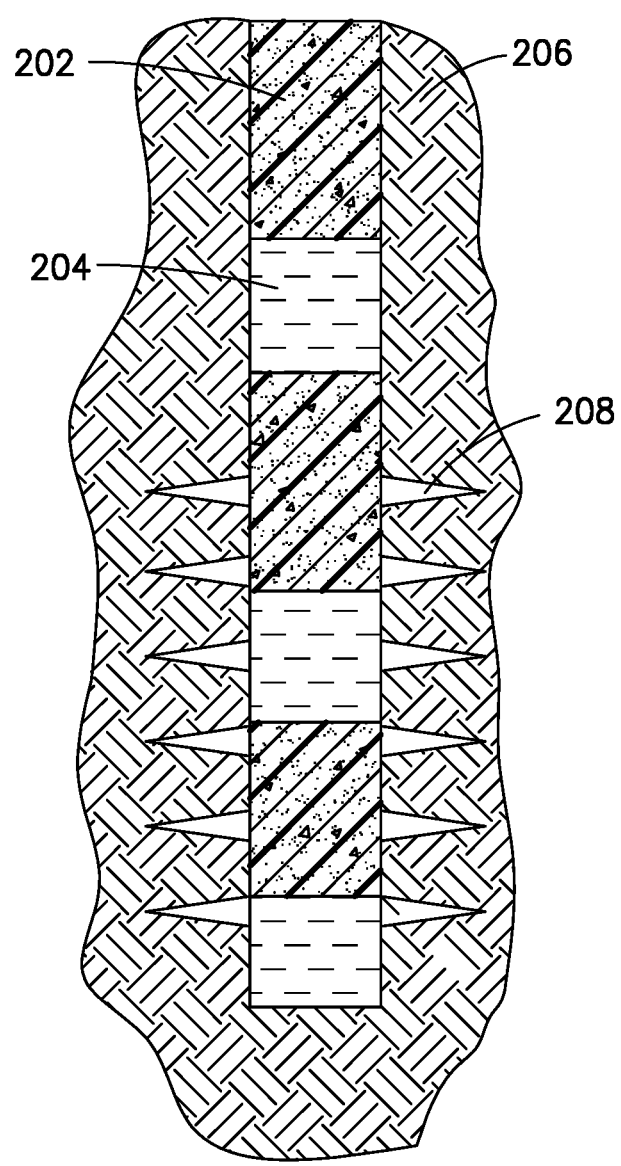
FIG. 2 is an illustration of the delivery of a treatment fluid pumping sequence into a fractured wellbore interval in accordance with embodiments of the present disclosure.

FIGS. 1 and 2 depict embodiments of placement methods for treatment fluids in accordance with the present disclosure into a formation. Following placement, treatment fluids may contain components that form polymeric clusters or pillars in fractures and channels to increase the permeability of the formation to fluid flow. In some embodiments, treatment fluids may be administered by alternating the injection of fracturing fluids containing polymer-forming materials and inert fracturing fluids or fluids that form degradable materials.

With particular respect to FIG. 1, a method of placement of the injection fluid is depicted in which a well treatment fluid is injected in stages that alternate between a polymer-forming composition (114) and a spacer fluid (112) through a wellbore (102) and into the fracture openings (104), with the end result of generating clusters or islands of polymerized material (108) spaced apart by a filler material (110) deposited from the spacer fluid (112) and into formation (106). In one or more embodiments, the filler material (110) may be inert or a polymerizable material that is degradable and functions to create partitions between the regions of polymer-forming material during the initial placement of the treatment fluid into the fracture. Following emplacement, the filler material may be pumped out or dissolved to produce flow channels between the pillars generated from the polymer-forming material. In some embodiments, treatment fluids containing polymer-forming materials may also include materials to provide reinforcement including fibers and other solids.

In one or more embodiments, polymer-forming compositions may be combined with a filler material (110) that is degradable or otherwise removable following setting of the polymer-forming compositions to form open flow channels for unimpeded fluid flow. In some embodiments, degradable filler material may be present in the spacer fluid (112) as a pre-formed particulate or as a chemical precursor that reacts to form regions of degradable filler materials interspaced between the polymeric pillars (108) that hold the fracture open. In some embodiments, filler materials (110) may include weighting agents and other solids that provide density and viscosity to match the polymer-forming treatment fluid (114) to minimize fluid interface instability and mixing between the fluid stages during injection into the wellbore. In some embodiments, spacer fluids (112) may contain one or more additives that control the polymerization of the polymer-forming composition (114). Interface strength and dispersion characteristics of the stages may also be modified in some embodiments by incorporating fibers and other particulates into one or more of the polymer-forming composition (114) and the spacer fluid (112). For example, mechanical suspension aids such as fibers, particles, nanoparticles such as nanocellulose, single-walled, double-walled and multi-walled carbon nanotubes and the like may be incorporated into one or more stages of a treatment fluid.

In one or more embodiments, treatment fluid stages may vary in volume from one operation to another. In some embodiments, pills of polymer-forming solutions (114) and pills of treatment spacing filler material (112) may be injected in volumes that range from about 2 to 10 bbl. The injected polymer forming solution will form a solid bulk pill with the size similar to the injected volume. Sometimes the volume of formed solid pill may be smaller than the injected polymer forming solution but still in a bulk form (several orders of magnitude larger than conventional proppants). Treatment fluid stages may be injected in alternating fashion in sequence in which each stage is pumped for a duration that may range from 5 to 20 seconds, or from 10 to 15 seconds in some embodiments, with injection rates that may range from 5 to 60 bbl/min, and from 10 to 50 bbl/min in some embodiments. The relative volume of the injected stages of polymer-forming component (114) and spacer fluid (112) and the pulse pumping time in the pumping schedule may vary with respect to each other in some embodiments, and may change during the execution of a given operation.

With particular respect to FIG. 2, a wellbore (206) is shown having a number of fractures (208) into which a treatment fluid in accordance with the present disclosure is pumped. The treatment fluid contains a sequence of component fluids that include a spacer fluid (204) and polymer-forming component (202). In one or more embodiments, the spacer fluid (204) may be aqueous, oleaginous, an invert or direct emulsion, or a foam having a gaseous internal phase such as nitrogen or carbon dioxide. In some embodiments, the polymer-forming component may be a self-assembly molecular structure or self-assembled complex or microemulsion or emulsion formulated to contain the polymer-forming materials in the solubilized phase. In some embodiments the polymer-forming components can be made with nanoparticles to tune the mechanical strength and wettability requirements of the final polymer based on reservoir rock type e.g. carbonates, sandstone, silica etc.

In one or more embodiments, spacer fluids may be modified to contain a degradable filler material that may occupy the space between the polymer-forming components during emplacement and later removed to form open channels around the polymeric pillars generated by the treatment fluid and through the fracture toward the wellbore. Removal of the degradable filler material may be influenced by such factors as invasion of formation fluids, by exposure to water, by passage of time, by the presence of incipient or delayed reactants in or mixed with the degradable filler material, by the post-injection introduction of an activating fluid, or any combination of the above.

In an embodiment, the pumping fluid can be a gas or foam based carrier instead of an aqueous based fluid. Advantages of using gas based carriers include: (1) when alkaline activators are used, the gas or foam based carrier minimizes the possibility of dilution of alkaline activators with aqueous pumping fluid; (2) certain gas carriers can also help enhance production and minimize the usage of water. Examples of gas carriers include but are not limited to carbon dioxide ($CO_2$), nitrogen ($N_2$) and natural gas. In one or more embodiments, the amount of additives in the polymer-forming stage may be maintained so that the density and the viscosity matches or approximates that of the spacer fluid stage as closely as possible, to maintain fluid interface stability and avoid mixing the stages. In some embodiments, the variation in density and viscosity may also be accounted for by combining one or both stages with additives such as solids and surfactants that modify the rheology of the treated stage. The viscosity of the polymer-forming fluid and spacer fluid can also be tuned with different additives. In one or more embodiments, the volume of each stage of the polymer-forming composition pulse injected may be a volume in the range of about 1 to about 500 percent of the total fluid volume. The volume of the polymer-forming composition pulse versus the spacer fluid may also be adjusted in some embodiments to suit various formation parameters such as porosity, Young's Modulus, and the like. In some embodiments, the polymer-forming composition will be administered in a "gated" fashion, or switched on an off while the aqueous phase is continuously pumped.

The volume of the spacer fluid (204) and polymer-forming component (202) may vary with respect to each other and may change during the duration of the job. In one or more embodiments, the ratio of the volume of the polymer-forming component to spacer fluid may range from 1:0.1 to 0.1:1. In some embodiments, the ratio of the polymerizable phase to spacer may range from 1:0.5 to 0.5:1.

In one or more embodiments, polymer-forming compositions may have density and viscosity that are compatible with the spacer fluid, or in embodiments in which there is no fluid interface stability issue during pumping, the spacer fluid (204) may be a standard fracturing fluid. In some embodiments, a polymeric or viscoelastic rheology modifier may be added to the spacer fluid and/or the polymer-forming component to control fluid loss and selected by considering fracture network geometry such as width, height, length, branchedness, to remedy fluid loss and leak off of fluid treatments into the formation porosity/matrix.

In one or more embodiments, polymer-forming composition stages within a multistage treatment fluid may be multiphasic, isolating the polymer-forming component and initiators in differing phases during delivery and then disrupting the phase separation at the target interval. In some embodiments, a polymerization initiator may be present and isolated from the polymerizable species in an external or internal phase of the polymer-forming composition, or in a spacer fluid stage of a treatment fluid, and later combined with the polymerizable species by a number of possible mechanisms such as phase separation, viscous fingering between the phases, or triggering changes in the stability of the interphase boundary. In embodiments in which viscous fingering is used, filler materials may be used to provide a viscosity/density contrast to induce fingering between the fluid phases. The interphase boundary between a multiphase composition separating a polymerizable species and an initiator may also be modified to trigger polymerization by using a surfactant that is susceptible to degradation under elevated temperatures or triggering changes in the polarity of the surfactant using pH or ionic interference.

Figure 3:
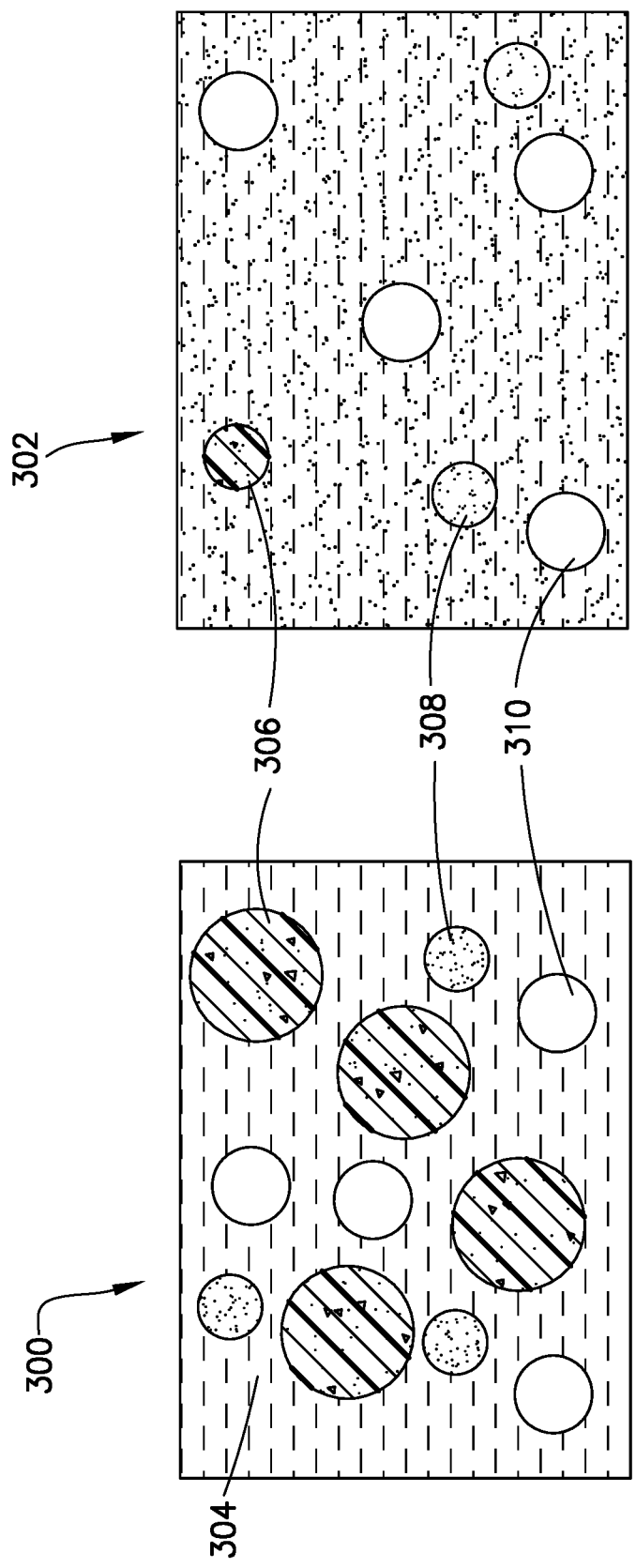
FIG. 3 is an illustration of various treatment fluid formulations in accordance with embodiments of the present disclosure.

In one or more embodiments, the polymer-forming composition stage of a treatment fluid may be aqueous, oleaginous, or an emulsion. With particular respect to FIG. 3, polymer-forming components may polymerize by various mechanisms including suspension, emulsion, and dispersion polymerization, represented as (300), and bulk polymerization, as represented by (302). During bulk polymerization (302), a polymer is generated throughout a continuous phase of polymer-forming material (306), creating a polymeric mass. For other forms of polymerization such as suspension, emulsion, and dispersion polymerization (300), the polymer-forming components (306) are present in a discontinuous phase interspersed throughout a continuous phase of solvent or immiscible liquid (304). In addition to polymer-forming components (306) and solvents (304), polymer-forming compositions may also contain additives (308) such as stabilizer, surfactant, various filler materials, and initiators (310).

In an embodiment which utilizes suspension polymerization, treatment fluids and pills comprise polymer-forming droplets (306) with initiators (310) and other additives (308) such as stabilizers, inhibitors, fibers, and fillers, which may be pumped downhole with a continuous phase of an immiscible solvent as a suspension. Following polymerization initiation, small-size polymer particles will form and precipitate from the treatment fluid. The polymeric particle size may depend on a number of factors including pumping rate, temperature, and chemical kinetics of the particular polymer-forming system. In a non-limiting example, during fracturing operations, the reduced flow rate and agitation leads to the generation of polymer clusters and particles that are larger than the pore size of the formation, which may prevent blocking pores exposed on fractured surfaces.

In an embodiment which utilizes dispersion polymerization, the polymer-forming components (306) may dissolve in the solvent (304) prior to polymerization, but will become insoluble after forming a polymeric pillar. Suitable solvents may be aqueous fluids or any solvent that can dissolve or suspend the polymer-forming components, but allow the formed polymer to precipitate and not dissolve the formed polymer. In some embodiments, the diameter of the dispersed phase may be controlled such that it is in a bulk form greater than the average pore size distribution of the formation to prevent blocking pores or otherwise restricting flow from the fractured rock surfaces. The size of the dispersed phase and the resulting polymerized particles may be controlled by adjusting the concentration of polymer-forming components, or providing additives to the polymer-forming composition stage such as stabilizers or dispersants.

In some embodiments, polymer-forming materials (306) may be combined with surfactants, surfactant/non-surfactant mixture, variable chain length polymers, different shapes of nano-particles, initiators (306), and other additives (310), and pumped into a wellbore as an oil-in-water or water-in-oil solution. The polymeric pillars may then be formed by phase separation between the organic and aqueous phase, triggered by pH, temperature or additives. The size of the final polymerized pills may be controlled, for example, by tuning the concentration of the surfactant or polymer-forming components, or by the addition of non-surfactant stabilizers or nano-particle based polymerization terminators.

In embodiments utilizing bulk polymerization, the polymer-forming components (306) may be combined with initiators (310) and other additives (308) such as surfactants, fiber or particles and pumped into the wellbore as part of the pulse pumping between spacer fluid stages. The size of the polymeric pillar generated during bulk polymerization is often orders of magnitude larger that the pore size distribution. Polymerization of polymeric pillars in accordance with the present disclosure may be initiated by any suitable system known in the art including the application of heat, light, and/or the use of one or more initiators.

Figure 4:
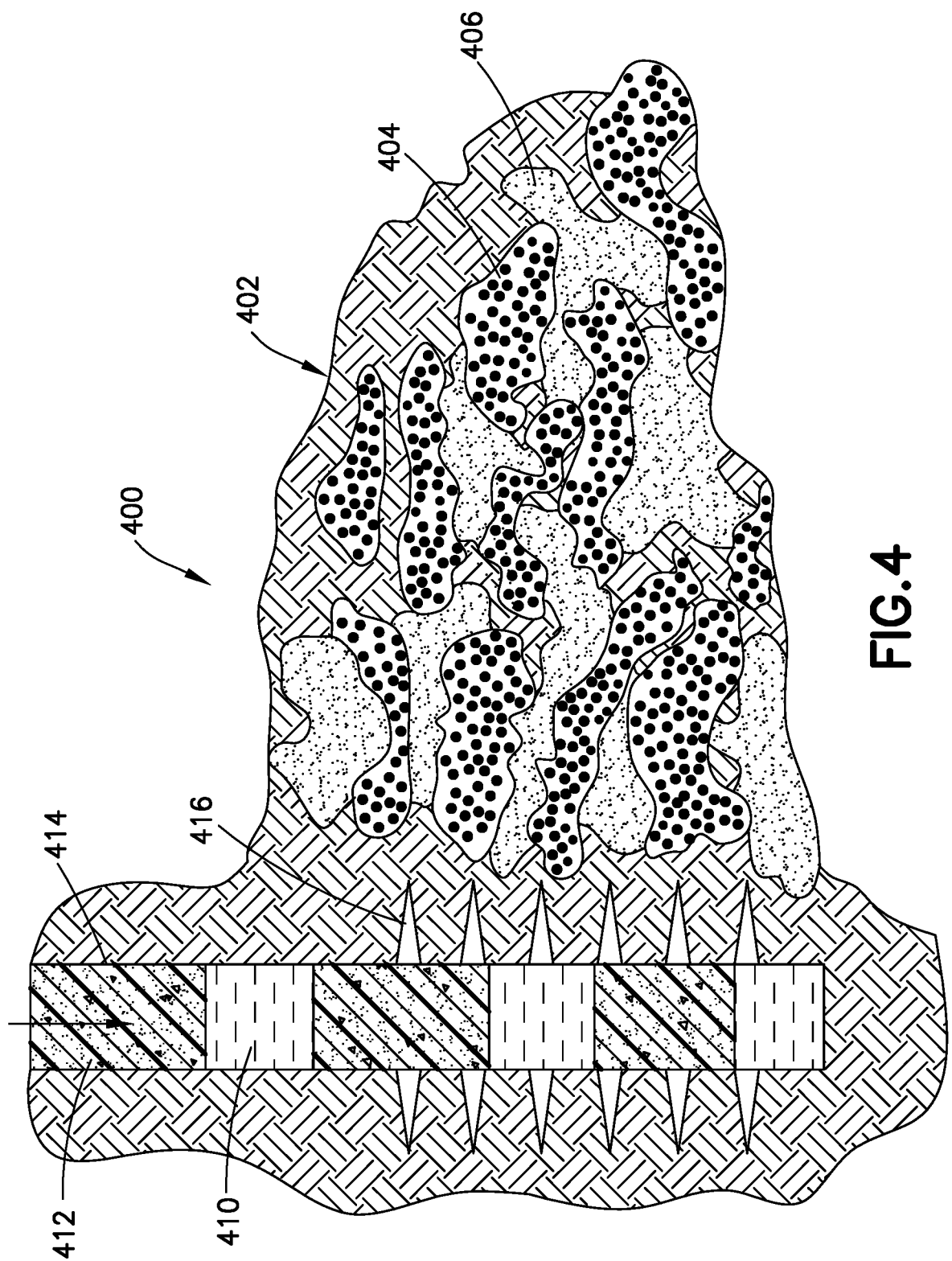
FIG. 4 depicts the formation of polymeric pillars using a dispersed phase treatment fluid in a fractured interval in accordance with embodiments of the present disclosure.

With particular respect to FIG. 4, a fracture system (400) treated using dispersed phase polymerization is shown following delivery of a treatment fluid containing stages of polymer-forming component (412) and spacer fluid (410) into a wellbore (414) and induced fractures (416). During dispersed phase polymerization, clusters of polymeric particles (404) are generated following the initiation of polymerization, producing polymer particles having an overall diameter larger than pore size distributions within the fracture.

The polymerization of the polymer-forming composition may be initiated in order to form polymeric pillars or solid support structures (404) that function to keep the fractures within the formation open. Further, in embodiments in which the spacer fluid stages contain filler materials (406) that deposit following emplacement of the treatment fluid, the filler material (406) may be degraded, dissolved, or broken down to form open channels. Degradable filler materials in accordance with the present disclosure include degradable polymers, degradable particles, degradable fibers, solid particulate salts, wax beads, and the like. Following pillar generation and removal of degradable filler materials, the solid agglomerate of particles act as supporting pillars in the fracture network away from the near wellbore area. Polymeric pillars may hold certain loads and keep the fractures open to allow reservoir production from the fracture network created as a whole.

Figure 5:
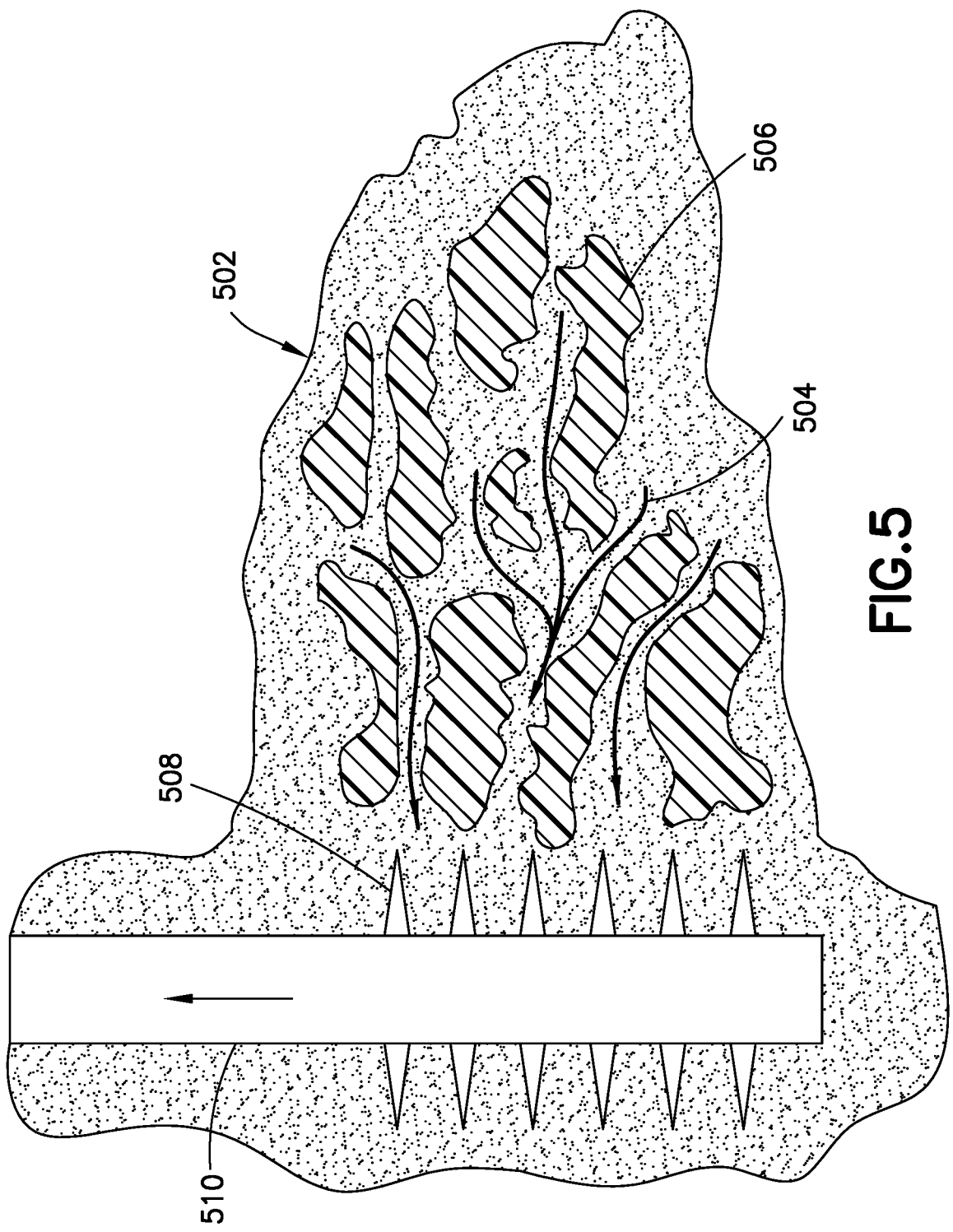
FIG. 5 depicts the formation of polymeric pillars using a bulk phase treatment fluid in a fractured interval in accordance with embodiments of the present disclosure.

In the case of bulk polymerization, the polymer-forming component of a treatment fluid forms a polymeric mass following polymerization. With particular respect to FIG. 5, a schematic illustration in a section of the wellbore (502) showing the formation of polymeric pillars (506) as a result of in-situ bulk polymerization of polymer-forming components injected from a wellbore (510) into a fracture (504). In one or more embodiments, treatment fluids injected into a formation may contain a polymer-forming component in addition to a spacer fluid component having a degradable filler material. Following curing of the polymer-containing component to form polymeric pillars (506), the degradable filler material may be removed to create flow channels (504) through the formation.

Figure 6:
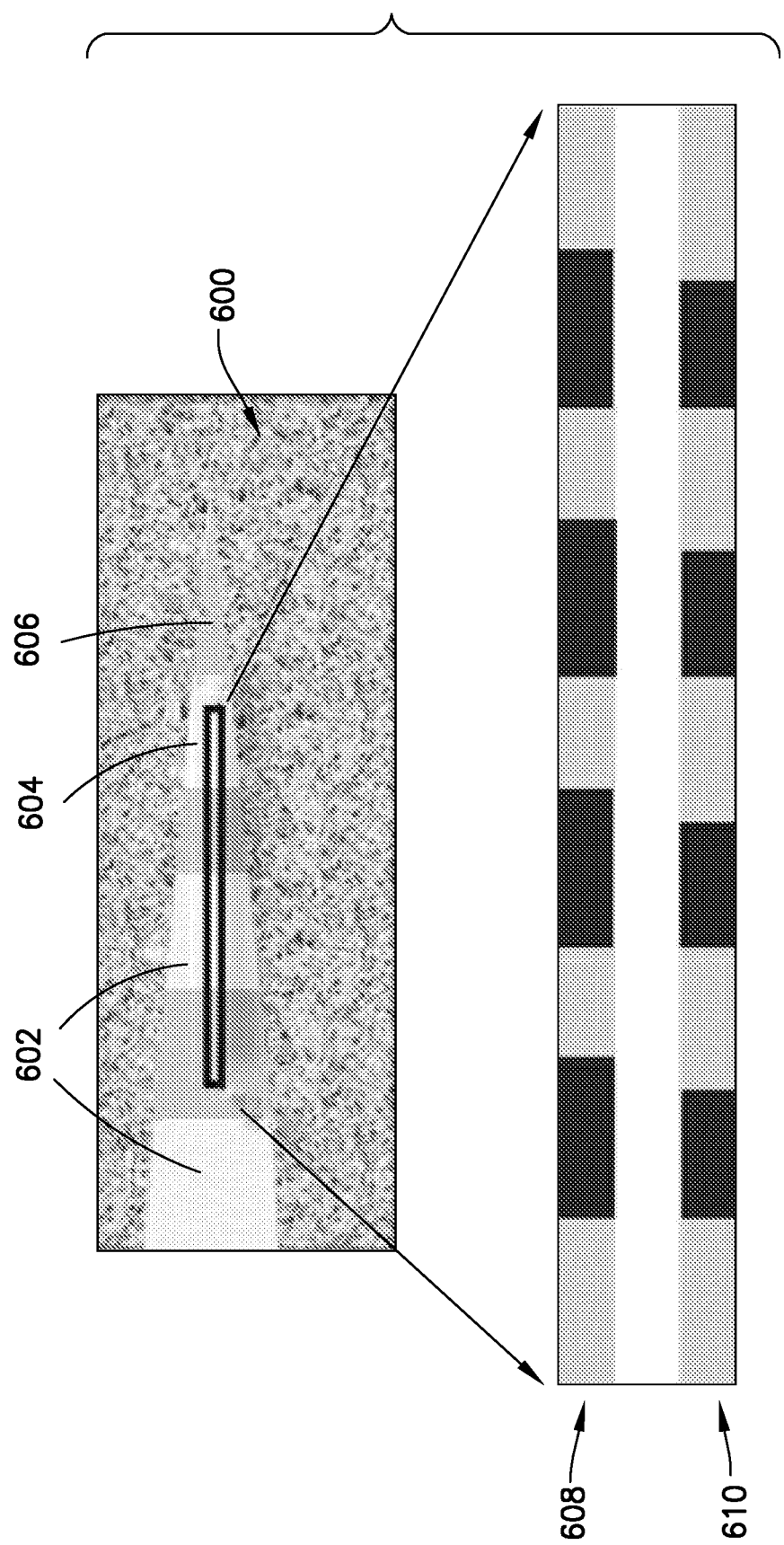
FIG. 6 depicts the formation of polymeric pillars for various pumping regimes in accordance in accordance with embodiments of the present disclosure.

In one or more embodiments, the shape and size of the pillars, and the spacing between the pillars are tunable by changing the pumping schedule of the pulse pumping strategy. In a non-limiting example, the pills of polymer-forming solutions and pills of treatment spacing filler material may be injected in volumes that range from about 2 to 10 bbl. In non-limiting examples, the shape of the pill is cylindrical, disc shaped, or any regular or irregular shape such as cubes or viscous fingers, which is tunable using different spacing fluid and additives. With particular respect to FIG. 6, a fracture (604) in a formation (600) is shown containing an injected treatment fluid having alternating stages of polymer-forming component (606) and spacer fluid (602). In some embodiments, control over the size of the polymer pillars may involve increasing the ratio of the polymer-forming component with respect to the spacer fluid as shown in pumping schedule (608). Conversely, with a shorter pumping interval for the polymer-containing component, smaller pillars may be obtained. The spacing between pillars may also be controlled by adjusting the spacer fluid stages between the polymer-forming component stages in the pumping schedule as shown in (610). Bulk polymerization may be an exothermal process, and reaction rate may increase with increasing temperature. In some embodiments, the temperature and the reaction rate of polymerization may be controlled by tuning the pumping schedule. For instance, a longer sequence of pumped water around the polymer-forming component may dissipate heat generated during polymerization and slow the overall reaction rate.

In one or more embodiments, polymer-forming compositions in accordance with the present disclosure may be thermosetting polymer compositions. Thermosetting polymer compositions may remain liquid during pumping and transition to a solid or semi-solid state prior to fracture closure within the formation. Control of polymerization kinetics may involve estimating one or more of the time for the thermosetting polymer composition to reach the fracture, the time for the fracture to close, and the kinetics of the polymer-forming reaction for the given system. Polymerization kinetics may be influenced by the selection of monomers and catalysts, initiator concentration, fluid type, and temperature.

In one or more embodiments, polymerization of a thermosetting polymer composition may be initiated by elevation of the temperature of the composition above the initiation temperature, i.e., the composition is stable at low temperature and initiates when the composition encounters elevated temperature such as that present in the formation. In embodiments directed to temperature-initiated polymerizing compositions, compositions may be stored and delivered to the treatment target at a temperature below the initiation temperature and heated quickly to induce polymerization and solidification prior to the closure of formation fractures. In some embodiments, the initial temperature and the pumping rate for a temperature-setting composition may be estimated using the modeling work described below.

Figure 7:
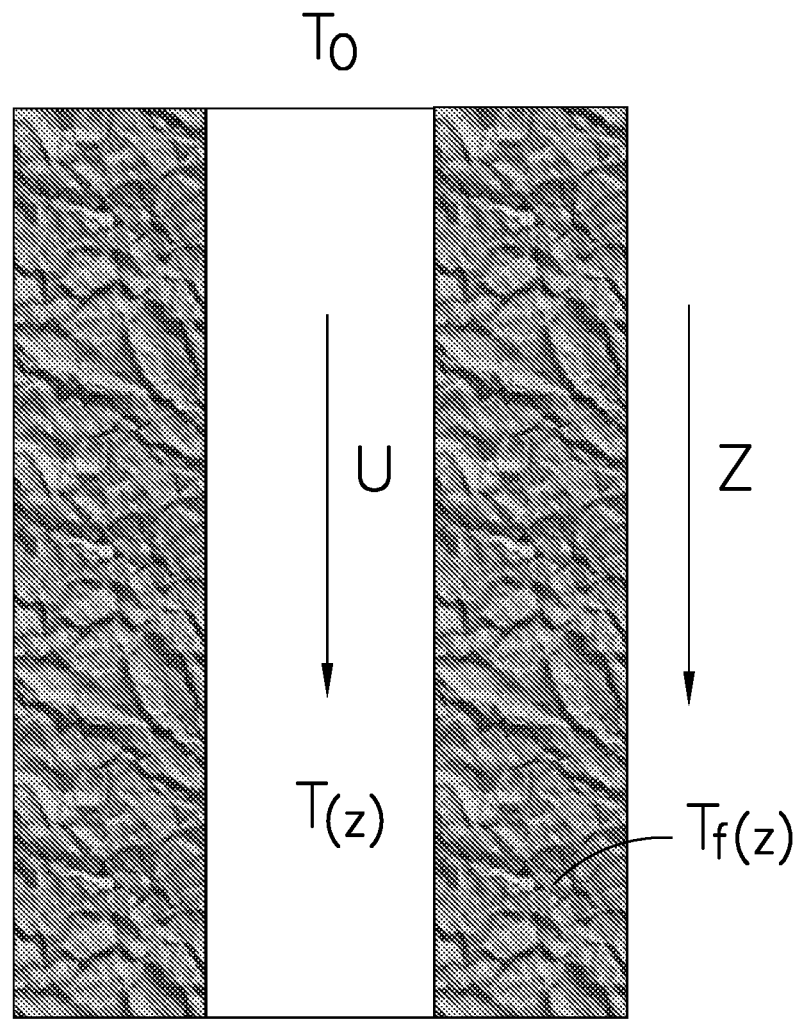
FIG. 7 depicts a schematic of fluid pumping into the formation in accordance with embodiments of the present disclosure.

With particular respect to FIG. 7, the flow of a treatment composition comprising water and a polymer-forming solution into a borehole is shown. The pumping velocity is defined as U and the initial temperature for the pumping fluid is $T_o$. The temperature for the formation as a function of depth z is defined as $T_f(z)$. The governing equation for the heat-transfer is shown in Eq. 1, where $\rho$ is density, C is heat capacity, and k is the thermal conductivity of downhole fluid.

$$\rho C\left(\frac{\partial T}{\partial t} + U\frac{\partial T}{\partial z}\right) = k\left(\frac{\partial^2 T}{\partial R^2} + \frac{\partial T}{R\partial R} + \frac{\partial^2 T}{\partial z^2}\right) \quad (1)$$

The boundary conditions are given by Eqs. 2-4.

$$T = T_o \text{ at } z = 0 \quad (2)$$

$$\delta T/\delta z = 0 \text{ at } z = \infty \quad (3)$$

$$k\delta T/\delta R = h(T - T_f) \text{ at } R = R_{formation} \quad (4)$$

In one or more embodiments, the governing equations may be simplified, while maintaining effectiveness. In some embodiments, the average temperature in the cross-section may be calculated by defining temperature as a function of depth and time as shown in Eq. 5, where A is the area of cross-section.

$$\overline{T}(z,t) = 1/A \int T dA \quad (5)$$

The 1/R term in the governing Eq. 1 may be neglected and considered as a two-dimensional problem. Further, the time-derivative is removed by assuming the temperature will reach steady-state after a certain time of pumping. With these simplifications, the governing equation becomes Eq. 6, where $\alpha = C\rho U/k$ and $\beta = h/kR$.

$$\frac{\partial^2 \overline{T}}{\partial z^2} - \alpha \frac{\partial \overline{T}}{\partial z} + \beta(T_f - \overline{T}) = 0 \quad (6)$$

If $T_f$ is a constant, an analytical solution can be obtained, which is given by Eq. 7.

$$\overline{T}(z) = T_f - (T_f - T_o)e^{\frac{\alpha - \sqrt{\alpha^2 + 4\beta}}{2}z} \quad (7)$$

Figure 8:
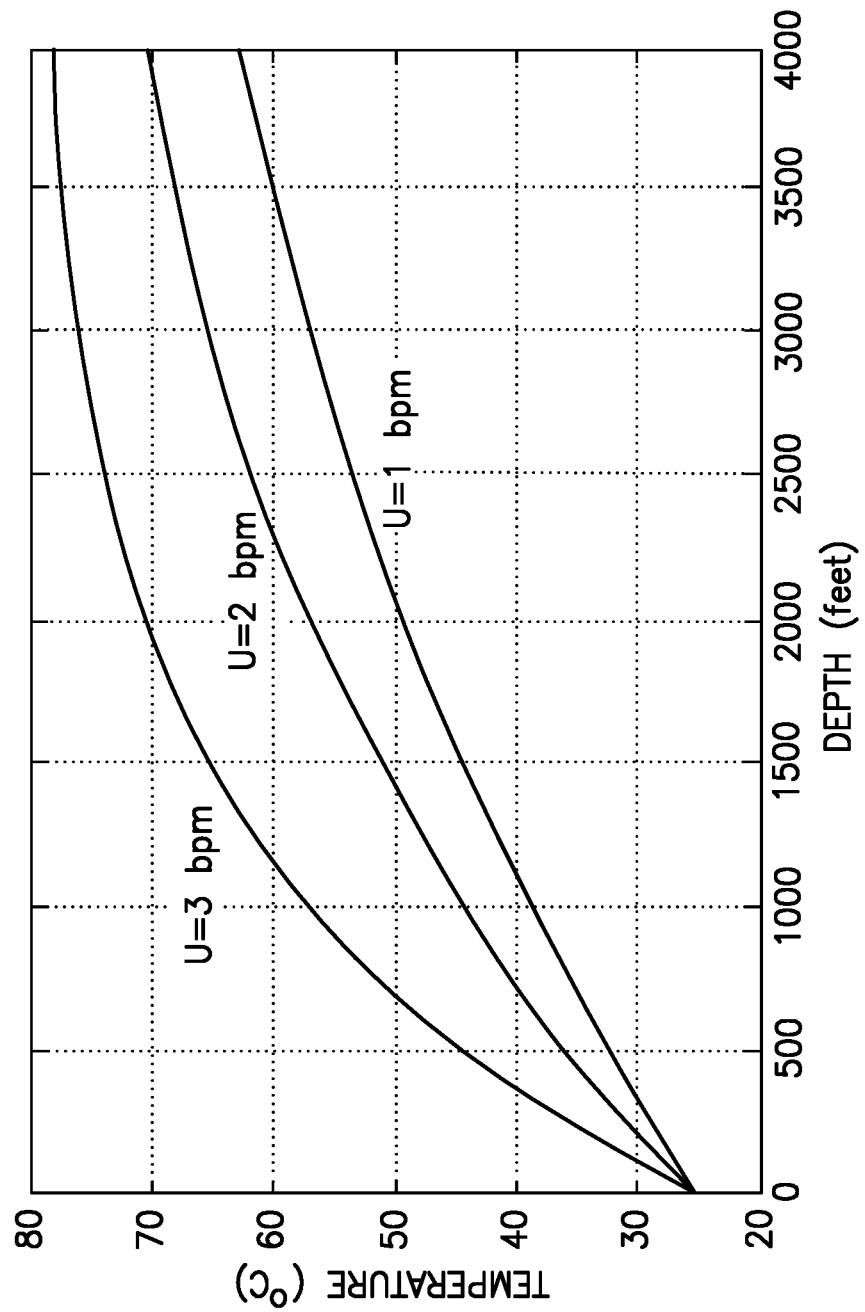
FIG. 8 depicts a plot of the average temperature change as a function of wellbore depth in accordance with embodiments of the present disclosure.

Qualitatively, the faster the pumping rate, the slower the temperature will increase. In cases when the borehole temperature varies with depth, the equation (6) is solved numerically. As an example, a problem is constructed in which the borehole diameter is 6 inches, the initial temperature is 25° C., and the borehole temperature is 80° C., and where the polymerization will start when the temperature is above 70° C. The fluid travels approximately 4000 feet to reach the formation. The temperature changes with height for different pumping velocities are plotted in FIG. 8. In order to ensure the fluid temperature stays below 70° C., it may be desirable to have a pumping rate greater than 2 barrels per minute (BPM).

Figure 9:
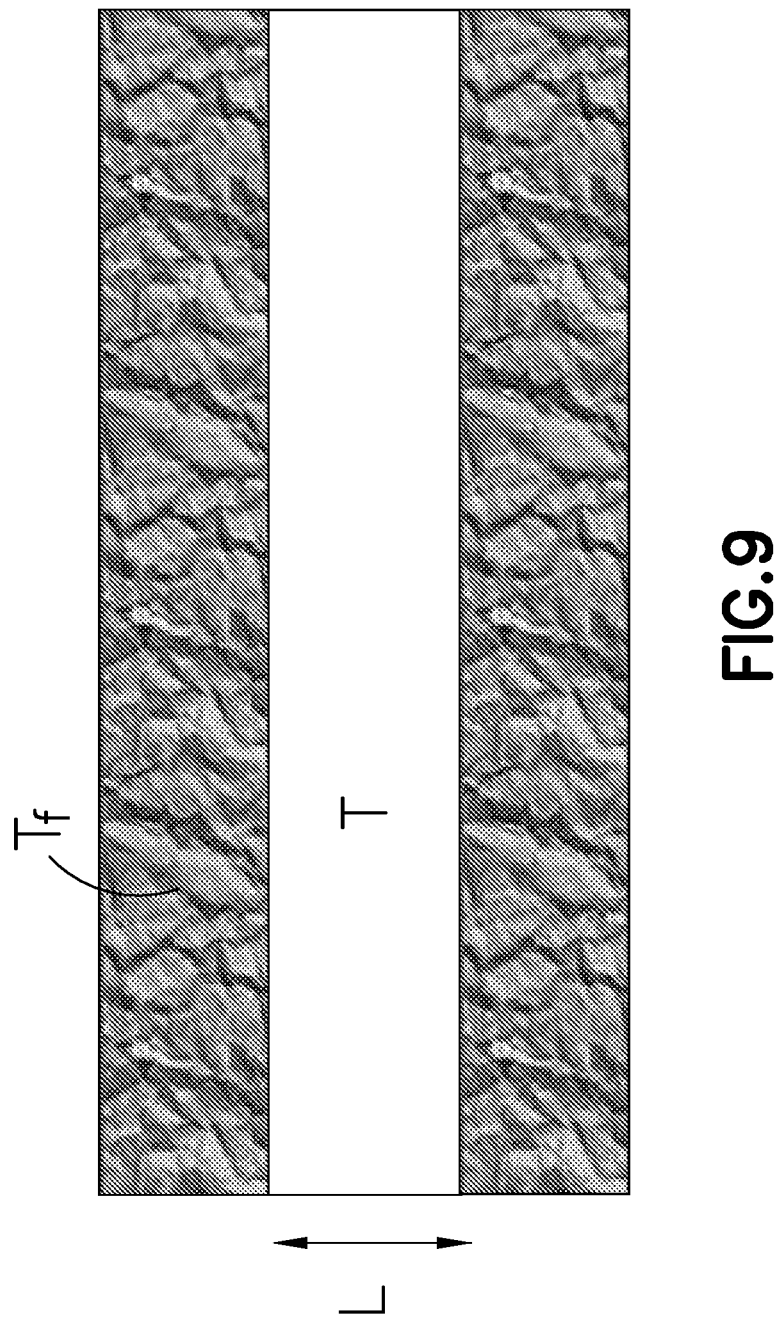
FIG. 9 depicts a schematic of fluid inside a fracture in accordance with embodiments of the present disclosure.

A model may also be used to determine the pumping rate based upon the specified downhole conditions, where $\rho = 1$ kg/m$^3$, C=4179 J/kg, k=0.6 W/mK, and h=10 W/m$^2$K. Once the fluid reaches the fracture, the fluid will be heated up from both sides of the formation, as illustrated in FIG. 9. The governing equations may then be given by Eqs. 8-10, where $T_p$ is defined as the initial temperature when the pillar is placed into the fracture. Eqs. 8-10 may be solved numerically in some embodiments.

$$\rho C \frac{\partial T}{\partial t} = k \frac{\partial^2 T}{\partial x^2} \quad (8)$$

$$T = T_f \text{ at } x = 0 \text{ and } L \quad (9)$$

$$T = T_p \text{ at } t = 0 \quad (10)$$

The time for the temperature to reach its equilibrium may then be scaled qualitatively by Eq. 11.

$$\frac{L^2}{k/(C\rho)} \quad (11)$$

If length L is on the order of 1 inch and k/C$\rho$ is on the order of 1 mm/s, then the time for temperature increase may be on the order of minutes. If the fracture closure time to close is fast relative to the cure time of the polymer-forming component of the treatment fluid, $T_p$ may be increased to reduce the time for the temperature to heat up. Note that formation closure time depends on both crack and formation properties. In some embodiments, formation closure time may be estimated using the G-plot methodology, which is described in Yew, C. H.: Mechanics of Hydraulic Fracturing, Gulf Publishing Company, Houston, 1997, p 167.

In one or more embodiments, a pumping method using the modeling above comprises the following processes: (a) using the knowledge of critical reaction temperature and the downhole conditions, determine the minimum pumping rate, $U_{min}$, by solving the equation (6); (b) using the knowledge of fracture closure time, (c) determine the temperature $T_p$ by solving the governing Eqs. 8-10; (d) using the value of $T_p$, determine the maximum pumping rate, $U_{max}$; and (e) choosing the proper pumping rate between the range [$U_{min}$, $U_{max}$]

Polymer-Forming Compositions

Polymer-forming materials in accordance with the present disclosure may be polymerized downhole through suspension polymerization, dispersion polymerization, emulsion polymerization, bulk polymerization, and the like. The polymer forming materials can be designed to meet different downhole pressure and temperature requirements (from less than 100° F. to more than 400° F.), with the non-limiting examples described below. In some embodiments polymerization can be initiated by a nanomer or a nanoparticle. These nanomers and nanoparticles can be organic, inorganic or combination of both.

In non-limiting examples, any polymers that can form solid pillars/discs in-situ from monomers, their solutions or the solution of co-polymers under downhole conditions can be used. The polymers may be thermoplastics, thermosets, rubbers, elastomers, thermoplastic elastomers, and the like. Thermoplastic polymers produced from polymer-forming compositions in accordance with the present disclosure may include polyolefins such as polyethylene, polypropylene, and butylenes, polystyrenes (PS) and copolymers thereof, acrylic polymers, methacrylic polymers, polyvinyl chloride (PVC), polyvinyl acetate (PVA), polycarbonate (PC), and the like. Example of thermosets may include crosslinked acrylic, crosslinked polyesters (unsaturated polyester resin), epoxy, vinyl esters, phenolic, and their mixture/blend/copolymers. Elastomers that may be used in accordance with methods of the present disclosure may include any elastomer containing monomers and prepolymers capable of dissolving in a solvent before crosslinking, and then crosslink to form a solid phase, such as hydrogenated nitrile butadiene rubber (HNBR), ethyelene propylene diene monomer (EPDM), polydimethylsiloxane (PDMS), natural rubber etc. Copolymers that may be used in accordance with embodiments of the present disclosure include copolymers derived from any of the above polymers such as polystyrene-polybutadiene (PS-PB) copolymers, block copolymers such as polystyrene-block-polymethylmethacrylate (PS-b-PMMA), acrylonitrile butadiene styrene (ABS), and the like. In one or more embodiments, co-polymer compositions may be tuned to achieve the desired plastic and elastic behavior by a number of techniques including monomer selection, modification of the polymer backbone with charged or hydrophobic functional groups, and tuning the molecular weight.

In one or more embodiments, polymer-forming compositions may include one or more epoxy resins or epoxy-containing species. In some embodiments, epoxy resins may include aromatic and aliphatic epoxy resins. Suitable aromatic epoxy resins may include bisphenol A epoxy, bisphenol AP epoxy, bisphenol AF epoxy, bisphenol B epoxy, bisphenol BP epoxy, bisphenol C epoxy, bisphenol C epoxy, bisphenol E epoxy, bisphenol F epoxy, bisphenol G epoxy, bisphenol. M epoxy, bisphenol S epoxy, bisphenol P epoxy, bisphenol PH epoxy, bisphenol TIM epoxy, bisphenol Z epoxy, glycidylamine epoxy, novolac epoxy, and mixtures thereof. Suitable aliphatic epoxy resins may include any cycloaliphatic epoxy resins and aliphatic polyol-based epoxy resins. Reactive diluents are typically epoxy reactive diluents such as ARALDITE® DY series from Huntsman and ROYOXY™ RAD series of epoxy diluents from Royce, etc.

Polymer-forming compositions in accordance with the present disclosure may contain one or more unreactive diluents, such as xylene, n-butanol, ethylene glycol monobutyl ether, methyl ethyl ketone (MEK), Methyl isobutyl ketone (MIBK), t-butyl acetate, toluene, propylene glycal monobutyl ether, provide low viscosity and are easier to be pumped at high velocity.

In one or more embodiments, polymer-forming compositions may polymerize by ring-opening-metathesis polymerization (ROMP) of monomers such as norbornene and norborene derivatives, cyclopentadiene and cyclopentadiene derivatives. In embodiments directed to the use of ROMP polymerization, polymer-forming compositions may also include catalysts such as complexes of tungsten, molybdenum, and ruthenium. Polymer-forming compositions in accordance with the present disclosure may also utilize living polymerization chemistries, which may be used in combination with additional co-monomers to form block copolymers.

In one or more embodiments, polymer-forming compositions may include polymer solutions containing ionic or covalent crosslinkers that may be pumped down directly to crosslink and form polymer networks downhole. The ratio of the polymers and the amount of crosslinkers may be tuned in some embodiments to form polymeric pillars having various thermal and mechanical properties.

In other embodiments, polymer dissolved in a solvent can be pulse pumped directly downhole. The polymer can be precipitated out by solvent shifting or by changing the environment of the solution. For example, a polymer solution may be delivered into the targeted region of the wellbore and precipitated out of solution through the addition of a non-solvent. Non-solvents in accordance with the present disclosure may be water or other organic solvents in which the polymer does not dissolve. For the other methods, the precipitation of solid polymer can be achieved by changing the pH value, temperature of the solution, or by adjusting the ionic strength through the addition of various salts. Examples of salt additives include calcium chloride, aluminum sulfate, and sodium chloride.

Polymerization Initiators

In one or more embodiments, polymer-forming compositions that cure by free radical polymerization may be combined with one or more thermal initiators that release free radical containing species upon exposure to predetermined temperatures such as when exposed to formation temperatures. Thermal initiators in accordance with the present disclosure may activate at temperatures that range from 50° C. to 140° C. in some embodiments, and from 70° C. to 120° C. in other embodiments.

Thermal initiators may include acyl peroxides such as diacetyl peroxide, benzoyl peroxide, dibenzoyl peroxide, N,N-Dimethyl-p-toluidine (DMPT), ammonium peroxodisulfate, alkyl peroxides such as cumyl and t-butyl peroxide, hydroperoxides such as t-butyl and cumyl hydroperoxide, peresters including t-butyl perbenzoate, azo compounds, such as 2,2'-azobisisobutyronitrile (AIBN), and the like. In some embodiments polymerization can be initiated by a nanomer or a nanoparticle. These nanomers and nanoparticles can be organic, inorganic or combination of both.

At temperatures below 50° C., the combination of peroxide with a reducing agent may be used to initiate radical polymerization through a redox reaction. For example, ferrous ions may interact with various peroxides in order to initiate the radical polymerization. In one or more embodiments, chain transfer agents or reversible addition and fragmentation transfer (RAFT) agents could be used to control the molecular weight and the molecular weight distribution of generated polymers. Atom-transfer radical polymerization in combination with transition metal catalysts can tolerate many functional groups like allyl, hydroxyl, amino and could be used when other additives interfere with the radical polymerization. The combination of t-butyl peroxymaleic acid with Ca or Zn ion can also be used to initiate radical polymerization at low temperatures.

The curing agents include amidoamine based, aromatic amine based, phenalkamine and Mannich based, aliphatic amine based, cycloaliphatic amine based, anhydride based, phenol and thiol based. The curing agents could also be waterborne amines such as the Aradur® brand from Huntsman. Curing accelerators, such as benzyl dimethyl amine, heterocyclic amine, tertiary amine, boron trichloride amine complex, and even solid aliphatic or epoxy amine adducts could be used to accelerate the cure of epoxy resins downhole. Additionally, using metal coordination complexes as the hardener could improve the viscosity, fracture toughness, electrical, thermal and chemical properties of the epoxy resins.

The monomers and co-monomers, polymer or co-polymer solutions will be pumped down with the initiator or cross-linkers with the frac fluid. The initiator or catalyst can be dissolved in water or in a monomer solution; it can also be heterogeneous, as solid particles or encapsulated solid particles. Examples of the initiators include acyl peroxides such as acetyl and benzoyl peroxide (BPO), Dibenzoyl peroxide (DBPO), N,N-Dimethyl-p-toluidine (DMPT), alkyl peroxide, hydroperoxide (such as t-butyl and cumyl hydroperoxide), ammonium peroxodisulfate, peresters (t-butyl perbenzoate), etc. Azo compounds, such as AIBN (2,2'-azobisisobutyronitrile). Other chemicals in the mixture can include stabilizer/inhibitors, chain transfer agents, surfactants, degradable fibers, reinforcement fiber or particles.

In some embodiments, the chemical composition of the polymeric pillars may be tuned by modifying a polymer-forming composition with co-monomers, and the addition of polymers and prepolymers having varied chemistry. The chemical composition of the polymers can also be tuned to modify the wettability between both the monomers, in-situ formed polymers and the formation. For example, the surface energy of in-situ formed polymers may be modified so the polymers will not adhere or block the pores in the formation, but are in physical contact with the formation via the compressive stress of the formation. The chemical composition of the polymers may also be tuned in some embodiments to modify the wettability between polymer-forming components and the formation. For example the surface energy of generated polymers may be modified so the polymer will not adhere or block the pores in the formation, but are in physical contact with the formation by the compressive stress of the formation. In some embodiments, the formation may be pretreated with a wellbore fluid containing a fluid loss additive or other suitable remedial fluid prior to pumping treatment fluids in accordance with the present disclosure to prevent the treatment fluids from entering the formation pores.

Polymer-forming compositions in accordance with the present disclosure may be polymerized using a number of polymerization mechanisms. In one or more embodiments, radical polymerization may be used to polymerize monomers and co-monomers in the polymer-forming compositions. Polymer-forming compositions that may be polymerized by radical initiators include unsaturated monomers such as acrylate, methacrylate, styrene, methyl styrene, vinyl esters, acrylonitrile, methacrylonitrile, acrylamide, methacrylamide, and the like. Polymer-forming compositions may also include unsaturated fatty acids, and polymers and prepolymers having varying degrees of unsaturation.

Surfactants

In one or more embodiments, polymer-forming materials and other additives may be solubilized in one or more surfactants and pumped into a fracture downhole. Surfactants in accordance with the present disclosure may be selected by choosing a surfactant having a phase inversion temperature close to reservoir temperature. For example, surfactants may form micelles at ambient temperature in which the polymer-forming materials are solubilized in the core of the micelles. At elevated temperatures above the phase inversion temperature, the hydrophobic-lipophilic balance (HLB) of the surfactants changes, releasing the polymer-forming components of the treatment fluid and initiating polymer formation. Released polymer-forming solutions may form pillars or clusters through polymerization or precipitation in the fracture. In one or more embodiments, the phase inversion temperature may be used to guide the selection of surfactant to customize the release of polymer-forming materials at a selected temperature within the formation. Surfactants may also be selected on the basis of phase structure in some embodiments, such as cylindrical micelles, large spherical micelles, lamellar phase, bi-continuous phase.

In some of the polymerization processes, surfactants will be added to control the formation and size of the polymer pillars. These surfactants may be added into the monomer directly or into the mixture of monomer-water mixture with other additives. Examples of the surfactant include anionic surfactants such as sodium dodecyl sulfate (SDS), sodium lauryl ether sulfate (SLES), alkyl sulfates (AS), alkyl phenol ether sulfates (APES), sulfonates such as sodium dodecylbenzene sulfonates, cationic surfactant such as benzalkonium chloride (BAC), dimethyldioctadecylammonium chloride, trimethylammonium bromides (TAB) such as cetyl trimethylammonium bromide (CTAB); hexyltrimethyl ammonium bromide, octyltrimethyl ammonium bromide, decyltrimethyl ammonium bromide, dodecyltrimethyl ammonium bromide, hexadecyltrimethyl ammonium bromide, octadecyltrimethyl ammonium bromide; non-ionic surfactant such as linear chain alkyl alcohols, cetyl alcohol, stearyl alcohol and fatty alcohol, poly(ethylene oxide), hydroxyethyl cellulose, Pluronic block copolymers surfactant such as poly(ethylene glycol)-polypropylene glycol)-poly(ethylene glycol) (PEG-PPG-PEG), poly(ethylene oxide)-polypropylene oxide)-poly(ethylene oxide) (PEO-PPO-PEO); Zwitterionic surfactants such as phosphatidylcholine, phospholipids phosphatidylserine etc. Polymers can be polyvinyl alcohol, polyethylene oxide, poly propylene oxide, and polyglycol.

Additives

To ensure the monomers do not react with initiators prematurely (before reaching the fracture tip), stabilizers/inhibitors are added into the monomers to prevent premature polymerization and maintain the stability of the monomers during transportation and fracturing. Examples of the inhibitors for radical polymerization include quinones, phenol, aniline, and nitrobenzene. Examples of the stabilizers for suspension, dispersion or emulsion polymerization include calcium carbonate, calcium phosphates or bentonite clay, polyvinyl alcohol etc. To minimize the damage to the formation during placement, water soluble inhibitors/retarders, such as $FeCl_3$ and $CuC_{12}$, for stopping or delaying the radical polymerization, could be used in the aqueous phase of the fluid sequence. Water can carry these inhibitors to the pores of the formation, which retard or stop any polymerization that could occur in the pores, thus minimizing the risk of plugging the pores.

In one or more embodiments, polymer-forming compositions may include one or more catalysts to control the reaction rate. Examples of the catalyst include cobalt acetate, $CuC_{12}$, $CuBr_2$, and the like. In some embodiments, the reaction rate may be controlled by both the concentration of the catalyst and by temperature.

In one or more embodiments, degradable fibers may be added to treatment fluids in accordance with the present disclosure as a component of polymer-forming composition stage or the spacer fluid stage. Degradable fibers may increase cohesion when added to a treatment fluid stage, and stabilize the fluid interface between pills during pumping. When incorporated as a component of a polymer-forming composition, degradable fibers may reinforce the generated polymer, strengthening the pillar after polymerization.

Degradable fibers in accordance with the present disclosure may be made of any degradable PLA, PGA, nylon, starch fibers, acrylic polymers, polyester, polyethylene (PE), Polyethylene terephthalate (PET), carbon, silk, cellulose, and cellulose derivatives.

In one or more embodiments, polymer-forming compositions may be modified in response to application demands such as the need for increase resistance to downhole temperature and/or fracture stress requirements. The thermal and mechanical properties of polymeric pillars in accordance with the present disclosure may be tuned by incorporating various additives into the polymer-forming composition such as nanoparticles, microparticles and fibers. Examples of the reinforcing nanoparticles or fillers include but are not limited to carbon black, clay nanoparticles, silica, alumina, zinc oxide, magnesium oxide, calcium oxide. Examples of the reinforced fiber fillers include carbon fiber, glass fibers, PEEK fibers, and PMMA fibers.

In some cases, degradable fibers will be pumped down together with the polymer-forming component to ensure uniform mixing of the liquid. The degradable fibers can be made of any degradable PLA, PGA, nylon, starch fibers, and the like. The thermal and mechanical properties of these polymers can be tuned by adding additives such as nanoparticles, microparticles and fibers; or by tuning the chemical composition of the co-polymers. Thus, a large selection of materials can be available to meet different downhole temperature and the fracture stress requirements. Examples of the reinforce nanoparticles or fillers include but not limited to carbon black, clay nanoparticles, silica, alumina, zinc oxide, magnesium oxide, calcium oxide. Examples of the reinforce fiber fillers includes carbon fiber, glass fibers, PEEK fibers.

In one or more embodiments, treatment fluids may include a variety of functional additives to improve fluid properties and to mitigate formation damage. In some embodiments, functional additives may include scale inhibitors, demulsifiers, wettability modifiers, formation stabilizers, paraffin inhibitors, asphaltene inhibitors, and the like. Other functional additives may include oxidizer breakers, corrosion inhibitors, compressed gases, foaming agents, and similar chemicals that improve the performance of the fracturing fluid.

In one or more embodiments polymerizing composition may be combined with one or more fluid loss additives to reduce the leak off of reactants into the formation surrounding the fraction. In some embodiments, fluid loss additives may be polymeric fluid loss additives such as starches or gums. Fluid loss additives may also include particulate solids including fine mesh sand such as 100 mesh sand, mica flakes, and other small solids designed to reduce fluid loss into narrow fractures. In some embodiments, fluid loss additives may be employed where a formation contains planes of weakness intersected by the main trunk fracture and it is desired to avoid creating and propping open a complex fracture network.

Fracturing operations in accordance with the present disclosure may be used in combination with enhanced recovery techniques that improve fracture initiation such as acid spearheading and high viscosity pill injection, or such techniques may be modified to contain treatment fluid materials. In some embodiments, a spearheading treatment may be injected to remove formation damage or increase permeability prior to injection of treatment fluids. Methods in accordance with the present disclosure may also include pumping a tail-in fluid following treatment fluids in accordance with the present disclosure that may be designed to improve the near wellbore connectivity to one or more hydraulic fractures and prevent unintentional fracture pinchout at the wellbore. For example, methods may include a mass of conventional proppant and/or a material that forms proppant upon curing in the final pulse of treatment fluid. In some embodiments, tail-in fluids may include proppant and additional proppant flowback control additives such as resin coated proppant, geometrically diverse proppants such as rods or ellipsoids, particulates, fibers, and other solids.

Other potential applications in accordance with the present disclosure may include the use of diversion pills, such as commercially available BROADBAND™ sequence pills, to improve the wellbore coverage of treatment fluids in accordance with the present disclosure. In embodiments incorporating diversion pills, a diversion pill may be pumped after a treatment fluid containing a sequence of alternating pulses of polymer-forming compositions and spacer fluid to inhibit fracture growth in a selected location. For example, a diversion treatment may be applied to one particular perforation cluster to limit growth, while diverting subsequent treatments to other intervals and enabling fractures to initiate at a new perforation clusters previously surrounding by more permeable formation intervals.

Treatment fluids in accordance with the present disclosure may be emplaced to stabilize fracture networks anywhere conventional proppants or sand are used, in addition to smaller fracture networks and applications otherwise unsuitable for standard proppant materials. In some embodiments, polymer-forming materials may be incorporated into the total volume of a fracturing fluid or into a smaller fluid volumes such as in a pad placed before or after a fracturing fluid. A further advantage of embodiments of the subject disclosure is that a less redundant horse power may be used to pump the well treatment fluid as the solids are formed in the wellbore thus eliminating erosion in pumps used to pump the well treatment fluid.

Although only a few examples have been described in detail above, those skilled in the art will readily appreciate that many modifications are possible in the examples without materially departing from this subject disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:
1. A method, comprising:
 (a) introducing an acid spearheading treatment into one or more intervals of a wellbore prior to introducing a multistage treatment fluid;
 (b) introducing the multistage treatment fluid into the one or more intervals of the wellbore,
  wherein the multistage treatment fluid includes an initiator, a polymer-forming composition, and a surfactant, wherein the initiator triggers polymerization by using the surfactant, and wherein the multistage treatment fluid comprises one or more stages of the polymer-forming composition and one or more stages of a spacer fluid, wherein the polymer-forming composition comprises a polymerizable species in a first phase and the initiator in a second phase;

(c) initiating polymerization of the one or more stages of the polymer-forming composition, wherein initiating polymerization comprises at least one of: coalescing the first phase and the second phase or initiating viscous fingering between the first phase and the second phase.

2. The method of claim 1, wherein at least one of the one or more stages of the spacer fluid comprise a degradable material.

3. The method of claim 2, further comprising dissolving the degradable material to create open channels in the one or more intervals of the wellbore.

4. The method of claim 1, wherein the ratio of the one or more stages of the polymer-forming composition and one or more stages of the spacer fluid is within the range of 1:0.1 to 0.1:1.

5. The method of claim 1, wherein the volume of each of the one or more stages of the polymer-forming composition is within the range of from 2 to 10 bbl.

6. The method of claim 1, wherein introducing the multistage treatment fluid into the one or more intervals of the wellbore comprises injecting the one or more stages of the polymer-forming composition and the one or more stages of the spacer fluid in sequence in which each stage is pumped for a duration that may range from 5 to 20 seconds, and at an injection rate that ranges from 5 to 60 bbl/min.

7. The method of claim 1, wherein at least one of the one or more stages of the polymer-forming composition polymerizes by a bulk polymerization process.

8. The method of claim 1, wherein at least one of the one or more stages of a polymer-forming composition comprise a fiber additive.

9. The method of claim 1, wherein at least one of the one or more stages of a spacer fluid comprise a fiber additive.

10. The method of claim 1, wherein at least one stage of the multistage treatment fluid comprises one or more additives selected from a group consisting of: initiators, crosslinkers, stabilizers, inhibitors, fibers, fillers, and surfactants.

11. The method of claim 1, wherein the multistage treatment fluid comprises a tail-in stage comprising proppant.

12. The method of claim 1, wherein initiating polymerization of the one or more stages of polymer-forming composition comprises the application of heat or the release of an initiator.

13. The method of claim 1, wherein at least one of the one or more stages of a polymer-forming composition polymerize to form a polymer selected from the group consisting of: thermoplastics, thermosets, rubbers, and elastomers.

14. The method of claim 1, wherein at least one of the one or more stages of a polymer-forming composition comprises nanomaterial.

15. The method of claim 1, wherein the nanomaterial is organic, inorganic or both.

16. The method of claim 1, wherein at least one stage of the multistage treatment fluid comprises one or more pumping fluids selected from a group consisting of: water-based, gas and foam.

17. The method of claim 1, wherein the one or more stages of the polymer-forming composition comprise a polymer and a crosslinker; and wherein initiating polymerization of the one or more stages of the polymer-forming composition comprises allowing the crosslinker to crosslink the polymer, wherein the resulting crosslinked polymer forms a polymeric pillar within a fracture in the one or more intervals of a wellbore.

* * * * *